United States Patent
Waggoner et al.

(10) Patent No.: US 12,017,191 B2
(45) Date of Patent: Jun. 25, 2024

(54) ADJUSTABLE ADDITIVE DELIVERY SYSTEMS AND DISPENSING CLOSURE VALVES FOR THE SAME

(71) Applicant: Cirkul, Inc., Tampa, FL (US)

(72) Inventors: Garrett Waggoner, Tampa, FL (US); Andrew Gay, Apollo Beach, FL (US); Philip McKeating, Boston, MA (US); Thomas Urbanik, Watertown, MA (US); Cole Houston, Central Falls, RI (US); John Green, Tampa, FL (US)

(73) Assignee: Cirkul, Inc., Tampa, FL (US)

( * ) Notice: Subject to any disclaimer, the term of this patent is extended or adjusted under 35 U.S.C. 154(b) by 0 days.

(21) Appl. No.: 16/235,913

(22) Filed: Dec. 28, 2018

(65) Prior Publication Data
US 2019/0291065 A1    Sep. 26, 2019

Related U.S. Application Data

(63) Continuation-in-part of application No. 15/451,384, filed on Mar. 6, 2017, now Pat. No. 10,888,826.
(Continued)

(51) Int. Cl.
    *A47J 43/27*          (2006.01)
    *B01F 23/451*        (2022.01)
    (Continued)

(52) U.S. Cl.
    CPC .............. *B01F 23/451* (2022.01); *A47J 43/27* (2013.01); *B01F 25/31433* (2022.01);
    (Continued)

(58) Field of Classification Search
    CPC .............................. A47J 43/27; B65D 51/2892
    (Continued)

(56) References Cited

U.S. PATENT DOCUMENTS 1,674,233 A * 6/1928 Williams ............... A47G 19/24
                                                              222/142.1
1,961,321 A     6/1934 Young
                      (Continued)

FOREIGN PATENT DOCUMENTS

AU      2017228456 A1    8/2018
AU      2018225178 A1    9/2019
            (Continued)

OTHER PUBLICATIONS

U.S. Appl. No. 16/436,861, filed Jun. 10, 2019, Garrett S. Waggoner.
(Continued)

*Primary Examiner* — David L Sorkin
(74) *Attorney, Agent, or Firm* — Wolf, Greenfield & Sacks, P.C.

(57) ABSTRACT

A mixing cartridge delivery system, which mixes additive with base liquid flowing through it, utilizes a dispensing closure valve to achieve improved flow of mixed liquid from the cartridge. A closure base may include a tethered lid. A flexible valve, such as a slit valve, is supported on a valve supporting end of the closure base and retained thereon with a valve retainer that interlocks with the closure base. The system may include a one-way valve for base liquid and a mixing section defined in the cartridge. The dispensing closure valve achieves improved flow characteristics in combination with the base liquid valve. The dispensing closure valve also prevents leakage and inadvertent discharge from the cartridge system.

32 Claims, 12 Drawing Sheets

Related U.S. Application Data

(60) Provisional application No. 62/723,447, filed on Aug. 27, 2018.

(51) Int. Cl.

| | | |
|---|---|---|
| *B01F 25/314* | (2022.01) | |
| *B01F 25/315* | (2022.01) | |
| *B01F 33/501* | (2022.01) | |
| *B65D 47/06* | (2006.01) | |
| *B65D 47/24* | (2006.01) | |
| *B65D 55/16* | (2006.01) | |
| *B01F 101/14* | (2022.01) | |

(52) U.S. Cl.
CPC ...... *B01F 25/315* (2022.01); *B01F 33/50111* (2022.01); *B65D 47/06* (2013.01); *B65D 47/243* (2013.01); *B65D 55/16* (2013.01); *B01F 2101/14* (2022.01)

(58) Field of Classification Search
USPC .................... 366/130; 222/142.1, 145.5
See application file for complete search history.

(56) References Cited

U.S. PATENT DOCUMENTS

| | | | |
|---|---|---|---|
| 2,102,105 A | 12/1937 | Edward | |
| 3,207,486 A | 9/1965 | Daniel | |
| 3,217,931 A | 11/1965 | Farrar et al. | |
| 3,255,691 A | 6/1966 | Marius et al. | |
| 3,325,056 A | 6/1967 | Lewis | |
| 3,506,460 A | 4/1970 | Bayne | |
| 3,508,682 A | 4/1970 | Hollis et al. | |
| 3,760,986 A | 9/1973 | Castner et al. | |
| 3,850,346 A | 11/1974 | Richardson et al. | |
| 3,924,741 A | 12/1975 | Kachur et al. | |
| 4,115,066 A | 9/1978 | Muhle | |
| 4,132,308 A | 1/1979 | Goncalves | |
| 4,838,457 A | 6/1989 | Swahl et al. | |
| 5,045,195 A | 9/1991 | Spangrud et al. | |
| 5,092,750 A | 3/1992 | Leroy et al. | |
| 5,165,569 A | 11/1992 | Furuhashi et al. | |
| 5,325,996 A | 7/1994 | Bannigan | |
| 5,664,702 A | 9/1997 | Beauchamp | |
| 5,839,626 A * | 11/1998 | Gross | B65D 47/2031 222/494 |
| 5,890,624 A | 4/1999 | Klima et al. | |
| 5,899,363 A | 5/1999 | Bliss, III et al. | |
| 5,944,234 A * | 8/1999 | Lampe | B65D 47/0804 222/490 |
| 6,209,757 B1 | 4/2001 | Dumont | |
| 6,230,937 B1 | 5/2001 | Johnson et al. | |
| 6,482,451 B1 | 11/2002 | Baron | |
| 6,517,878 B2 | 2/2003 | Heczko | |
| 6,541,055 B1 | 4/2003 | Luzenberg | |
| 6,981,962 B1 | 1/2006 | Lenkerdorf | |
| 7,083,071 B1 | 8/2006 | Crisp, III et al. | |
| 7,118,012 B2 | 10/2006 | Butler | |
| 7,661,561 B2 | 2/2010 | Ophardt et al. | |
| 7,670,479 B2 | 3/2010 | Arett et al. | |
| 7,819,276 B2 | 10/2010 | Næsje | |
| 7,942,569 B2 | 5/2011 | Orben et al. | |
| 8,083,055 B2 * | 12/2011 | Simonian | B65D 47/243 206/221 |
| 8,365,960 B1 | 2/2013 | Kalaouze | |
| 8,413,844 B2 | 4/2013 | Arett et al. | |
| 8,464,633 B2 | 6/2013 | Anson et al. | |
| 8,511,465 B2 | 8/2013 | Seelhofer | |
| 8,622,237 B2 | 1/2014 | Choi et al. | |
| 8,641,016 B2 | 2/2014 | Tatera | |
| 8,684,240 B2 | 4/2014 | Sauer et al. | |
| 9,010,379 B2 | 4/2015 | Gothard et al. | |
| 9,060,592 B2 | 6/2015 | Brosius | |
| 9,302,831 B2 | 4/2016 | Wilson et al. | |
| 9,498,086 B2 * | 11/2016 | Waggoner | B65D 51/2892 |
| 9,650,189 B1 | 5/2017 | Lawson et al. | |
| 9,694,953 B2 | 7/2017 | Meyers et al. | |
| 9,771,195 B2 | 9/2017 | Lawson et al. | |
| 9,795,242 B2 * | 10/2017 | Waggoner | A47J 31/005 |
| 9,821,288 B2 | 11/2017 | Cerk et al. | |
| 10,232,998 B2 | 3/2019 | Presche | |
| 10,349,766 B2 | 7/2019 | Asseldonk et al. | |
| 10,888,826 B2 * | 1/2021 | Waggoner | B01F 13/002 |
| 2001/0025859 A1 | 10/2001 | Dumont | |
| 2001/0055242 A1 | 12/2001 | Deshmukh et al. | |
| 2003/0168474 A1 | 9/2003 | Widgery | |
| 2004/0007594 A1 | 1/2004 | Esch et al. | |
| 2004/0188280 A1 | 9/2004 | Young | |
| 2004/0262331 A1 | 12/2004 | Woolfson et al. | |
| 2006/0011664 A1 | 1/2006 | Hammond | |
| 2007/0138179 A1 | 6/2007 | Jacobs et al. | |
| 2007/0253280 A1 | 11/2007 | Orben et al. | |
| 2008/0190958 A1 | 8/2008 | Wyner et al. | |
| 2009/0026222 A1 | 1/2009 | Seelhofer | |
| 2009/0236303 A1 | 9/2009 | Lizerbram et al. | |
| 2010/0108715 A1 | 5/2010 | Santagiuliana | |
| 2010/0157723 A1 | 6/2010 | Vega | |
| 2010/0213223 A1 | 8/2010 | Ballentine | |
| 2011/0290677 A1 | 12/2011 | Simonian et al. | |
| 2012/0031925 A1 | 2/2012 | Greenberg | |
| 2012/0223100 A1 | 9/2012 | Simonian et al. | |
| 2013/0000733 A1 | 1/2013 | Gothard et al. | |
| 2013/0008919 A1 | 1/2013 | Honan et al. | |
| 2013/0139893 A1 | 6/2013 | Anson et al. | |
| 2013/0240564 A1 | 9/2013 | Albaum | |
| 2013/0319915 A1 | 12/2013 | Gellibolian et al. | |
| 2013/0334250 A1 | 12/2013 | Albaum | |
| 2014/0076173 A1 | 3/2014 | Pellaud et al. | |
| 2014/0092703 A1 | 4/2014 | Helou et al. | |
| 2014/0230659 A1 | 8/2014 | Waggoner et al. | |
| 2015/0128811 A1 | 5/2015 | Durairajasivam et al. | |
| 2015/0158654 A1 | 6/2015 | Petrov | |
| 2015/0336722 A1 | 11/2015 | Brook-Chrispin et al. | |
| 2015/0336724 A1 | 11/2015 | Simonian et al. | |
| 2016/0001936 A1 * | 1/2016 | Rap | B65D 43/16 222/490 |
| 2016/0150914 A1 * | 6/2016 | Waggoner | B01F 3/0865 366/130 |
| 2016/0152408 A1 | 6/2016 | Fuchs et al. | |
| 2016/0159632 A1 | 6/2016 | Wheatley et al. | |
| 2016/0317985 A1 | 11/2016 | Mutschler et al. | |
| 2017/0232406 A1 | 8/2017 | Waggoner et al. | |
| 2017/0296988 A1 * | 10/2017 | Waggoner | A47J 41/0083 |
| 2018/0178957 A1 | 6/2018 | Zalewski | |
| 2018/0296023 A1 | 10/2018 | Waggoner et al. | |
| 2019/0060849 A1 | 2/2019 | Waggoner et al. | |
| 2019/0291065 A1 | 9/2019 | Waggoner et al. | |
| 2020/0139313 A1 | 5/2020 | Waggoner et al. | |
| 2020/0156020 A1 | 5/2020 | Waggoner et al. | |
| 2021/0060503 A1 | 3/2021 | Waggoner et al. | |
| 2021/0169264 A1 | 6/2021 | Waggoner et al. | |

FOREIGN PATENT DOCUMENTS

| | | |
|---|---|---|
| AU | 2015349694 B2 | 5/2020 |
| CA | 2777990 A1 | 11/2013 |
| CA | 2968546 A1 | 5/2016 |
| CA | 3053808 A1 | 8/2018 |
| CN | 110612050 A | 12/2019 |
| CN | 107205565 B | 7/2020 |
| EP | 0795267 A2 | 9/1997 |
| EP | 1876901 B1 | 11/2011 |
| EP | 3220783 B1 | 8/2019 |
| EP | 3585224 A1 | 1/2020 |
| JP | H068999 A | 1/1994 |
| JP | 2001500205 A | 1/2001 |
| JP | 2005289518 A | 10/2005 |
| JP | 2009107672 A | 5/2009 |
| JP | 2010195481 A | 9/2010 |
| JP | 2012006663 A | 1/2012 |
| JP | 2013517188 A | 5/2013 |
| JP | 2013545673 A | 12/2013 |
| JP | 2018503571 A | 2/2018 |
| NO | 0100521 A1 | 1/2001 |

(56) References Cited

FOREIGN PATENT DOCUMENTS

| WO | 1998005853 A1 | 2/1998 |
|---|---|---|
| WO | 9947450 A1 | 9/1999 |
| WO | 1999047450 A1 | 9/1999 |
| WO | 2011149501 A1 | 12/2011 |
| WO | 2016081925 A1 | 5/2016 |
| WO | 2017152192 A1 | 9/2017 |
| WO | 2018156816 A1 | 8/2018 |
| WO | 2020046976 A3 | 7/2020 |
| WO | 2021108781 A1 | 6/2021 |

OTHER PUBLICATIONS

U.S. Appl. No. 17/146,463, filed Jan. 11, 2021, Garrett S. Waggoner.
English Translation of first Office Action dated Jan. 8, 2019 in China Application No. 201580062670.9.
English Translation of Office Action and Search Report dated May 13, 2020 in CN Application 201780013261.9.
English translation of Office Action dated Mar. 30, 2021 in Japanese Application No. 2018-545355.
English translation of Office Action dated Jul. 30, 2019 in JP Application No. 2017-545871.
EP Application 18757631.9, Supplemental European Search Report dated Nov. 16, 2020.
International Search Report and Written Opinion for International App. No. PCT/US2015/62026 dated Feb. 5, 2016 (11 pages).
International Search Report and Written Opinion of the International Searching Authority in International Application No. PCT/US19/48389 mailed on Jan. 17, 2020.
ISR and WO in PCT/US2017/021016 dated Jun. 6, 2017.
Supplemental European Search Report and European Search Opinion dated Jun. 13, 2018 in EP Application No. 15861063.4.
Supplemental European Search Report and Opinion dated Jul. 9, 2019 in EP Application 17760997.1.
Supplemental European Search Report dated Nov. 16, 2020 in EP Application No. 18757631.9.
U.S. Appl. No. 14/181,354, filed Feb. 14, 2014, Waggoner et al.
U.S. Appl. No. 14/948,225, filed Nov. 20, 2015, Waggoner et al.
U.S. Appl. No. 15/358,087, filed Nov. 21, 2016, Waggoner et al.
U.S. Appl. No. 15/451,384, filed Mar. 6, 2017, Waggoner et al.
U.S. Appl. No. 15/791,348, filed Oct. 23, 2017, Waggoner et al.
U.S. Appl. No. 15/903,014, filed Feb. 22, 2018, Waggoner et al.
U.S. Appl. No. 16/235,913, filed Dec. 28, 2018, Waggoner et al.
U.S. Appl. No. 16/436,861, filed Jun. 10, 2019, Waggoner et al.
U.S. Appl. No. 16/679,060, filed Nov. 8, 2019, Waggoner et al.
U.S. Appl. No. 17/067,546, filed Oct. 9, 2020, Waggoner et al.
U.S. Appl. No. 17/106,053, filed Nov. 27, 2020, Waggoner et al.
U.S. Appl. No. 17/146,463, filed Jan. 11, 2021, Waggoner et al.
U.S. Appl. No. 17/377,259, filed Jul. 15, 2021, Waggoner et al.
U.S. Appl. No. 17/539,833, filed Dec. 1, 2021, Waggoner et al.
U.S. Appl. No. 17/567,796, filed Jan. 3, 2022, Waggoner et al.
U.S. Appl. No. 17/567,799, filed Jan. 3, 2022, Waggoner et al.
U.S. Appl. No. 17/567,801, filed Jan. 3, 2022, Waggoner et al.
AU Application 2017228456, Examination Report No. 1 dated Jan. 25, 2022.
Japanese Application 20201113813.0, English Translation of Office Action dated Aug. 6, 2021.
PCT/US21/41887 Invititation to Pay Additional Fees mailed on Oct. 6, 2021.
PCT_US21_41887 International Search Report and Written Opinion dated Dec. 23, 2021.

* cited by examiner

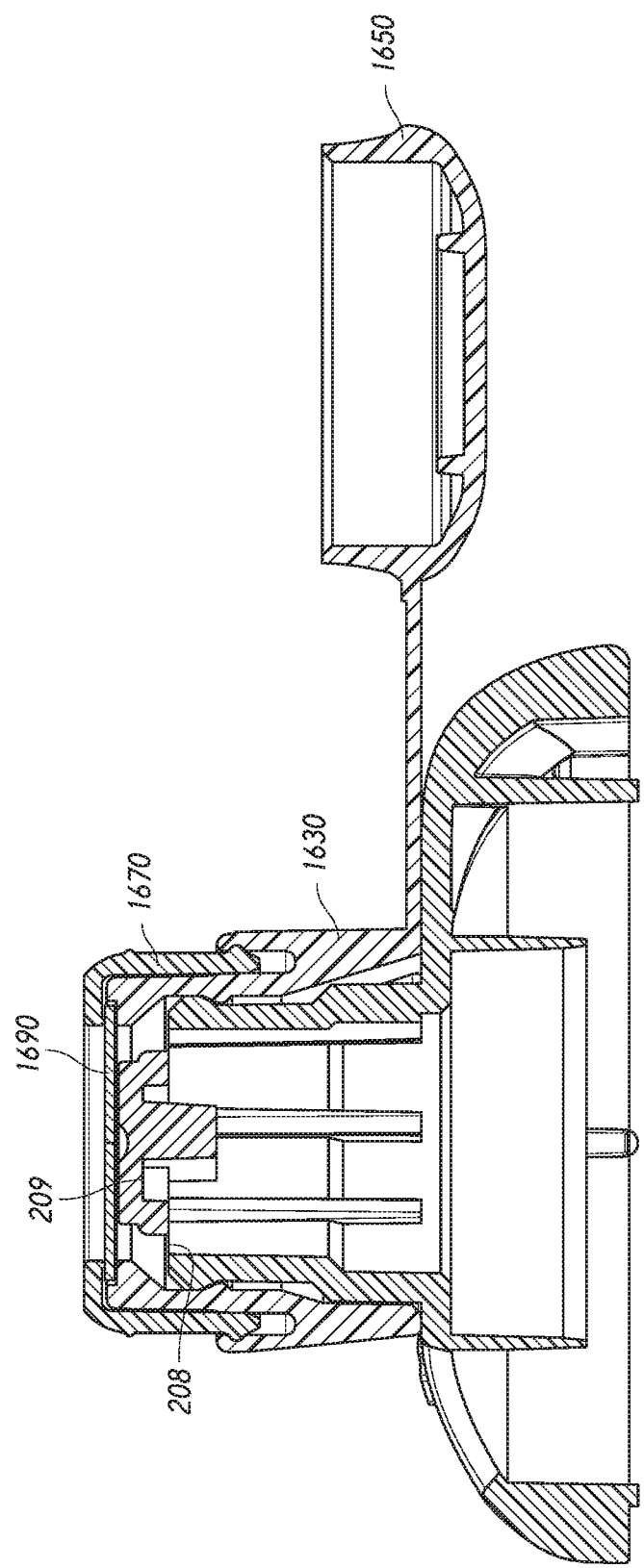

ADJUSTABLE ADDITIVE DELIVERY SYSTEMS AND DISPENSING CLOSURE VALVES FOR THE SAME

PRIORITY CLAIM AND REFERENCE TO RELATED APPLICATIONS

Priority is claimed under all applicable laws, treaties, conventions and regulations, based on U.S. Provisional Application No. 62/723,447, titled DISPENSING CAP CLOSURE WITH DRIP-PREVENTING FEATURES, filed on Aug. 28, 2018, and U.S. patent application Ser. No. 15/451,384, titled ADJUSTABLE ADDITIVE CARTRIDGE SYSTEMS AND METHODS, filed on Mar. 6, 2017. The subject matter described in all applications is incorporated herein by reference in its entirety. Where an element or subject matter of this application or a part of the description, claims or drawings in the aforementioned applications are not otherwise contained in this application, that element, subject matter or part is incorporated by reference in this application for the purposes of any and all applicable rules, procedures or laws.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The disclosure relates to dispensing and delivery systems for beverages and other products and more particularly to dispensing and delivery systems in which an additive, such as flavorings, concentrates or supplements, may be provided in replaceable, modular cartridges, which may include features for mixing the additive with a base liquid, such as water, as the base liquid flows through the cartridge and is consumed by a user. The disclosure further relates to dispensing and delivery systems and additive delivery systems that provide for user adjustment of the amount of additive that is mixed with the base liquid. The disclosure further relates to dispensing closures and dispensing closure valves and to mixing cartridges and additive storage and delivery systems and devices that may include such dispensing closure valves.

Recent advances in the art include adjustable mixing cartridge-based delivery systems and adjustable mixing cartridges, such as those describe in the above-referenced related applications. Such systems may mix additive with base liquid as the base liquid flows through the mixing cartridge and thereby add flavor to the base liquid as a user draws the mixture and through the cartridge. Such systems may include a one-way valve to prevent backflow of base fluid through the cartridge, thus maintaining a supply of base fluid in an unmixed state. The cartridge may have defined therein, upstream from the one-way valve, a mixing zone or mixing section, which may be a defined volume within the cartridge where the additive is added to and mixed with the base liquid. In such systems, a push-pull cap closure may be employed for permitting a user to selectively dispense mixed liquid from the dispenser or close the dispenser by snapping the push-pull cap in a closed position. Such closures may be cumbersome to some users since the opening operation typically requires two-hand operation—one hand to hold the container and another to pull the closure open. In addition, such closures do not facilitate a quick termination of flow when contents are dispensed, leaving the possibility for dripping of contents after a user takes a sip, which is undesirable. Further, such closures may not be ideal for dispensing for all users tend to have somewhat restricted flow and may be undesirable when higher flow rates and volumes of dispensed liquid are desired by a user. And still further, pushing the cap closed may slightly compress the mixed liquid held in a mixing zone or mixing section in the cartridge and thus may result in the undesirable event of a small amount of mixed liquid may drip from and/or be forced out of the cap. Still further, during dispensing of such systems, when the cartridge and a container are inverted and the cap is open, mixture may drip from the cartridge even when a user is not consuming the contents.

There is a need in the art for improvements to such additive delivery systems that address the aforementioned challenges and others.

SUMMARY OF THE INVENTION

In accordance with aspects of the disclosure, an additive delivery system may include a dispensing closure valve to provide improved control of residual mixed liquid in the mixing zone or mixing section of the delivery system and may provide improved flow and dispensing characteristics. The dispensing closure valve may include a closure base having a valve retainer interlock for securing a valve retainer thereto. A valve component may include a slit valve configuration and may be held in place on the closure base with the valve retainer. The closure base may include a lid tethered thereto for sealingly engaging the valve retainer and sealing the closure. The dispensing closure valve may provide improved flow and dispensing characteristics as mixture is dispensed from the cartridge. The dispensing closure valve may prevent the discharge of, and contain residual mixed liquid within a mixing section of the cartridge when the cartridge is not in use by a user.

According to further aspects of the disclosure, the dispensing closure valve may interact with a base liquid flow valve to provide improved flow and control characteristics. The combination of a one-way base liquid flow valve and the dispensing closure valve, with a mixing section defined therebetween, has been discovered by applicant to produce desirable flow characteristics. More specifically, the configuration exhibits a constant proportional relationship between suction pressure and flow rate within a suction pressure range that may typically be applied by a user.

According to a further aspect, the dispensing closure valve is provided in a cartridge environment that includes a flow controlling structure in the cartridge spout. More specifically, the cartridge spout may include a button-shaped projection supported by radial spokes and radial flow passages. The valve membrane of the dispensing closure valve interacts with this structure to achieve desirable flow characteristics.

According to a further aspect, the dispensing closure may facilitate one-hand operation for both opening a lid. A tethering strap may connect the lid to the closure base and be configured to undertake a bowed configuration when the lid is installed on the closure base. Lateral force applied to the tethering strap produces an upward force on the lid, allowing a user to remove the lid by pressing on the tethering strap with a thumb or finger.

Unless otherwise defined, all technical and scientific terms used herein have the same meaning as commonly understood by one of ordinary skill in the art to which the described invention pertains. Although other implementations, methods and materials similar to those described herein can be used to practice the invention, suitable and example implementations, methods and materials are described below. All publications, patent applications, and other references mentioned herein are incorporated by reference in their entirety. In case of conflict, the present specification, including definitions, will control. In addition, the materials, methods and examples are illustrative only and are not intended to be limiting in any way. The details of one or more example implementations of the invention are set forth in the accompanying drawings and the description below. Other features, objects and advantages of the invention will be apparent from the description and drawings, and from the claims.

DESCRIPTION OF THE DRAWINGS

The above and other attendant advantages and features of the invention will be apparent from the following detailed description together with the accompanying drawings, in which like reference numerals represent like elements throughout. It will be understood that the description and embodiments are intended as illustrative examples and are not intended to be limiting to the scope of invention, which is set forth in the claims appended hereto. The following Figures, unless otherwise indicated, are all example apparatus, systems and methods according to aspects of the disclosure.

FIG. 15 is an assembled cross-section of the embodiment of FIG. 13.

DETAILED DESCRIPTION

Figure 1:
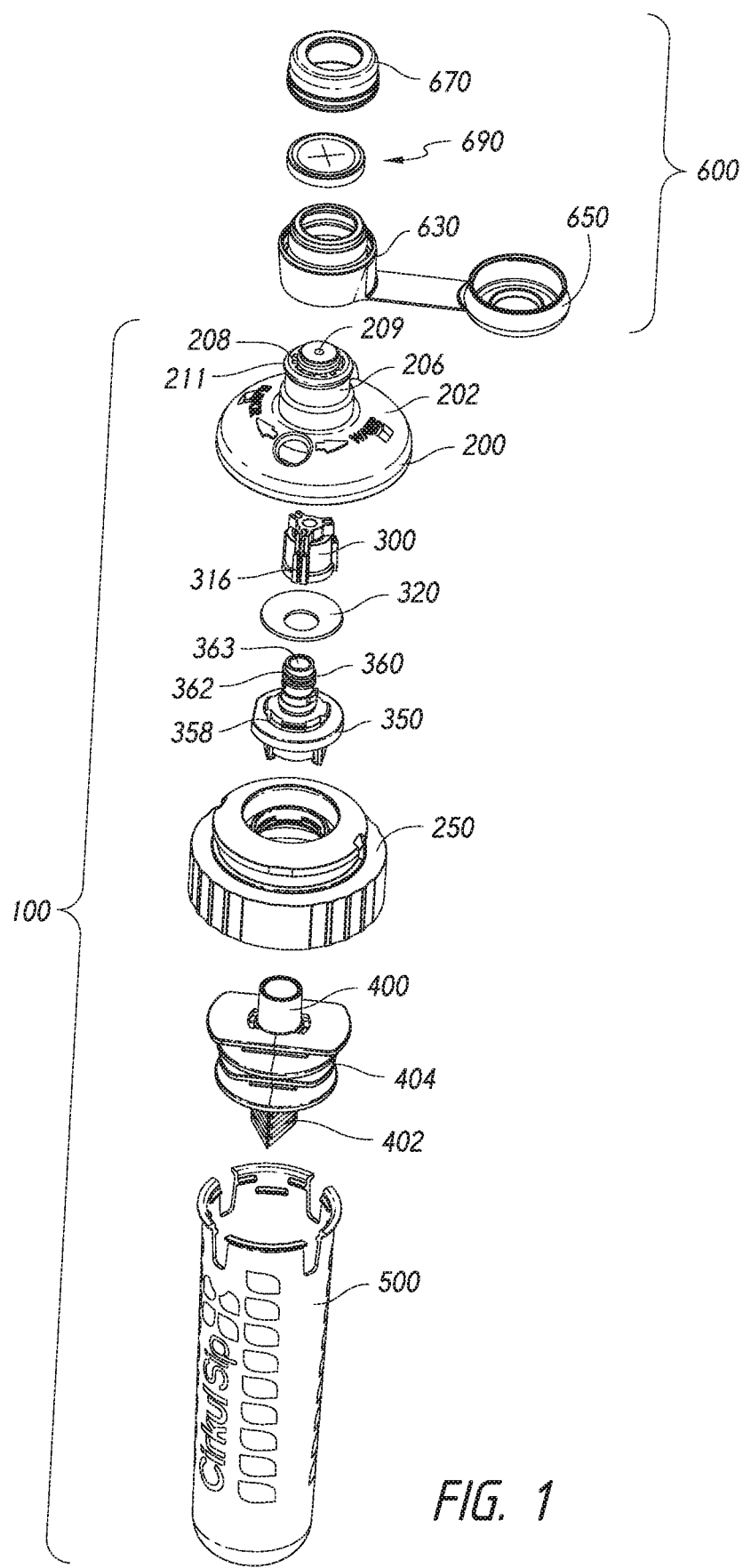
FIG. 1 is an exploded perspective view of an additive delivery system environment and dispensing closure according to aspects of the disclosure.
Figure 2:
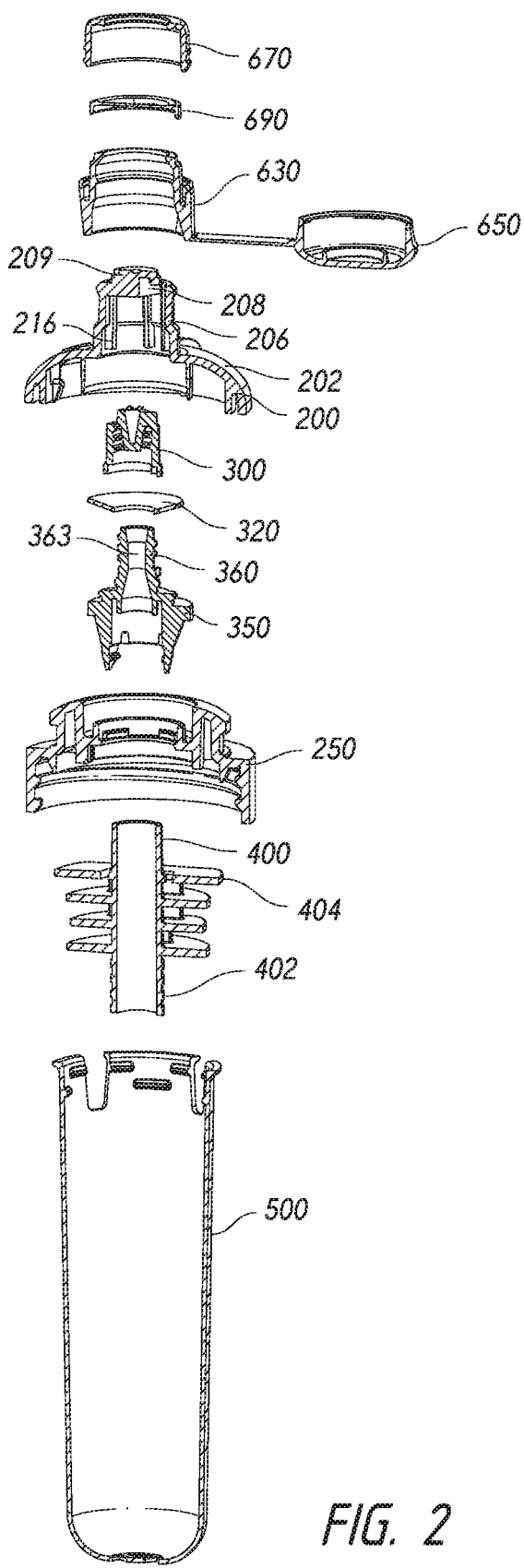
FIG. 2 is an exploded cross-section view of an additive delivery system environment and dispensing closure according to aspects of the disclosure.

FIGS. 1 and 2 illustrate an example dispensing closure and components of a mixing cartridge environment suitable for implementing aspects of the present disclosure. The dispensing closure is designated with the reference 600 and the environment is generally designated with the reference 100. The example components of the environment 100 are described in the above-identified related application and will be described briefly herein, as necessary for an understanding of the present disclosure. In accordance with aspects of the disclosure, a mixture dispensing closure, generally referenced as 600, may be provided in the mixing cartridge environment to achieve improvements as noted above in the Summary section and as further detailed herein.

An example mixing cartridge or additive delivery system environment 100 may include a number of components for facilitating adjustable mixing of additive (flavoring) with a base liquid (water) as the base liquid flows through the cartridge. The components may be assembled in a generally stacked arrangement using snap-fit or threaded connections that facilitate quick assembly. The components may include a cartridge cap comprising an additive flow adjustment actuator 200 cooperating with and mounted for limited rotational movement relative to a cartridge cap base 250. Additive flow adjustment actuator 200 may include a main body 202 and an actuator dispensing spout 206 extending upward therefrom and defining an interior flow passage for mixed liquid dispensed from the cartridge. At the end of the spout 206, a number of radial flow passages 208 may be defined between a number of radial spokes that support a button-shaped central projection 209 (see FIGS. 13 and 14, as well). A spout cap retaining projection 211 may extend around the outer circumference of an upper area of the spout 206. This general spout configuration may be adapted to receive a push-pull cap to selectively seal or open the spout.

An additive reservoir assembly may be disposed on the underside the cap base 250 and may include a reservoir spout 400 having a flexible pouch (not shown) secured thereto (i.e., by welded seam to fitment 402 for containing a supply of additive. A reservoir housing 500 may surround the reservoir spout and pouch and may be secured to the reservoir spout. The reservoir protective housing 500, which may be a cage or a solid-walled (illustrated) cover, may be snap-fit to one or more flanges 404 on the pouch reservoir spout 400. The reservoir housing 500 and reservoir pouch may be made of a transparent or translucent material to permit a user to view and identify the nature of the additive supply.

A mixing nozzle 350 may extend from the top of the cap base 250. The mixing nozzle 350 may include a threaded mixing nozzle stem 360 that includes integral threads 362 on an exterior surface thereof. The mixing nozzle 350 defines at least a portion of an additive flow path by way of an internal mixing nozzle additive flow passage 363 extending through the mixing nozzle stem 360. A bottom portion of the mixing nozzle 350 may receive the reservoir spout 400 thus providing for the flow of additive from the reservoir through the central passage 363. A plurality of radially arranged base liquid ports 358 may be defined in the mixing nozzle 350 to permit flow of base liquid and at least partially define a base liquid flow path through the mixing nozzle 350. An annular one-way base liquid flow valve 320 may be secured to the mixing nozzle 350 in a position where it provides for one-way flow of base liquid through the base liquid ports 358 and prevents backflow therethrough (see FIG. 9). As will be recognized, the mixing nozzle 350 defines parts of a base liquid flow path and part of an additive flow path therein. More particularly, the additive flow path is partially defined by a centrally or axially located passage 363 in the mixing nozzle, while the base liquid flow path includes the plural base liquid ports 358 that are disposed outward from the central location at least partially surrounding the additive liquid flow path. This flow geometry provides advantageous mixing and flow characteristics as further described in the above related applications.

Disposed between the additive flow adjustment actuator 200 and cartridge cap base 250 is an additive flow metering component 300, which cooperates with a mixing nozzle 350 to provide for adjustable mixture of additive with the base liquid. A conical seat an upper portion of the mixing nozzle 350 cooperates with a conical surface on the metering component 300. User rotation of the actuator 200 relative to the cap base 250 will rotate the metering component 300 relative to the mixing nozzle spout 360 and by way of threads 362 will permit a user to adjust the space between the conical surface on the metering component 300 and the conical seat on the mixing nozzle 350, which in turn, will adjust the flow of additive introduced into the base liquid as it flows through the cartridge. A number of axially extending guide rails 216 are defined on an interior of the spout portion 206 and define guide channels therebetween, which cooperate with and guide complementarily-shaped guide elements 316 on additive flow metering component 300 and allow it to slide upward or downward relative to the actuator 200 when the actuator 200 is rotated.

In operation, the additive flow adjustment actuator may be rotated relative to the cap base 250. Such rotation causes rotation of the metering component/insert 300 relative to the mixing nozzle 350, resulting in slight axial, i.e., upward or downward movement of the insert 300 by way of the cooperating threads between the insert 300 and nozzle 350. Axial movement of the metering insert 300 results in a change of additive flow through the metering area between the conical portion of insert 300 and the corresponding surface on mixing nozzle 350. As base liquid flows into the cartridge assembly, resulting from pressure changes within the base liquid container, i.e., from squeezing of a flexible bottle and or by suction applied by a user during consumption, and/or inverting or tipping, such action results in flow of additive and base liquid is mixed with additive at the appropriate level determined by the rotational position of the additive flow adjustment actuator.

As will be recognized, in the above-described environment, after a first use, there may be a residual mixture in a mixing section or zone in the cartridge that may be defined between the base liquid flow seal 320 and the exit passage of the spout 206. In operation, after a user takes a sip of the beverage, for example, this space may be occupied by mixed residual liquid. The base liquid flow seal 320 prevents backflow of the mixed liquid back through the cartridge. As such, the residual liquid in the mixing section or zone may be prone to drip upon the next dispensing (sip) by the user. Moreover, the use of a push-pull closure on the spout 206 may compress the residual liquid in the mixing section or zone, causing undesirable drip or discharge.

In accordance with aspects of the disclosure, the above-described environment may be provided with a dispensing closure valve which improves the operation of the mixing cartridge based additive delivery system. An example dispensing closure valve assembly 600 may include a closure base 630, a lid 650, a valve retainer 670 and valve 690. Details of each of these components and their operation will next be described.

Figure 3:
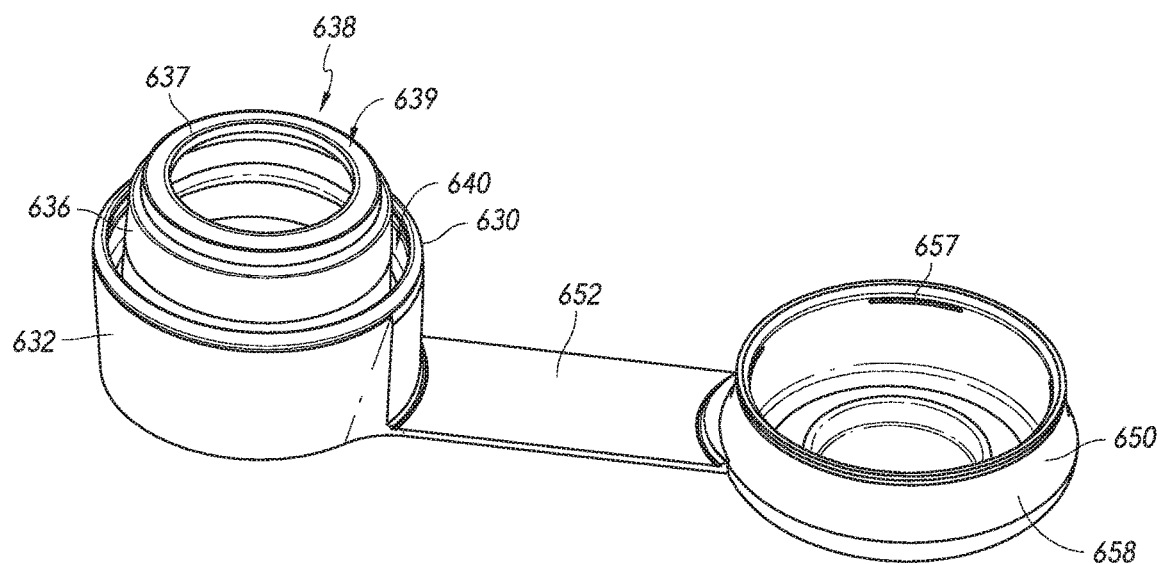
FIG. 3 is a perspective of a closure base.
Figure 4:
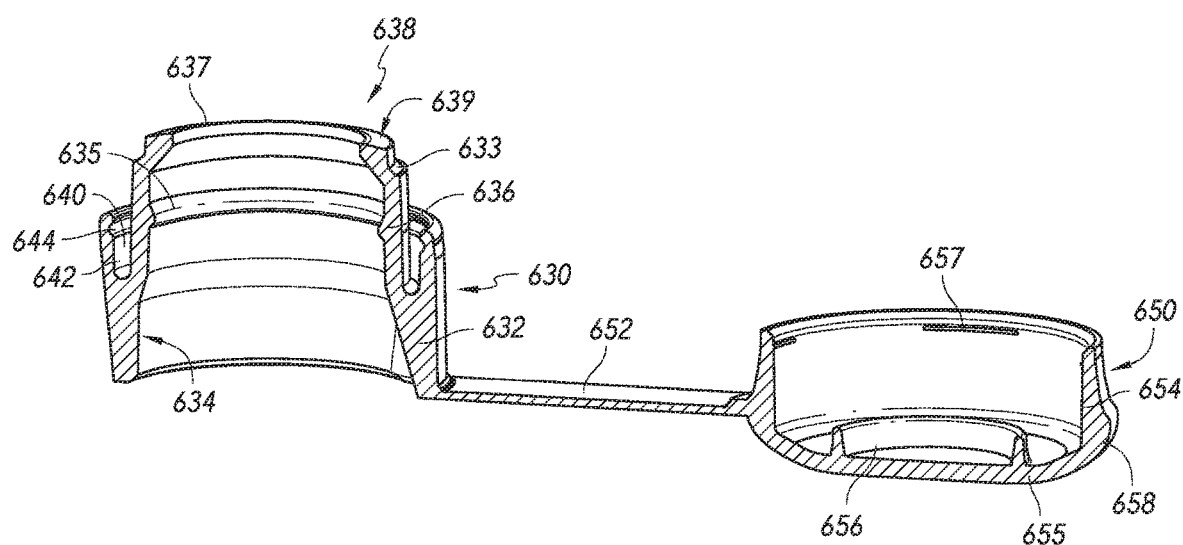
FIG. 4 is a cross-section of the closure base of FIG. 3.

An example closure base 630 and lid 650 are illustrated in FIGS. 3 and 4. Closure base 630 may include an annular spout-engaging skirt 632 having a tapered inner lower surface 634 to facilitate quick alignment/installation on the spout post 206, for example (FIGS. 1 and 2). A closure base spout 636 may extend upward from the skirt 632 to a valve retaining end 638. Closure base 630 may have a valve retainer interlock 640 for engaging and securing the valve retainer 670 (FIGS. 1, 2, 5 and 6) on the closure base 630. Interlock 640 may include an annular retainer securing groove or recess 642 formed in an upper portion of the closure skirt 632 and extending concentrically around a lower portion of the closure base spout 636. One or more annular interlock recesses or grooves 644 may be included in the retainer securing groove or recess 642 for providing a friction or interference fit with complimentary elements on the valve retainer 670 (FIG. 1) to secure the valve retainer to the closure base 630. Valve retaining end 638 of the closure base spout 636 may include a land or sealing surface 639 and an annular shoulder 670 both for engaging and/or supporting the valve 670 (FIGS. 1 and 2) as will be explained further below. The land or sealing surface 639 may have a slightly inclined orientation, extending upward and radially inward, such that a well-defined circumferential edge or lip 637 is provided to engage an underside of the valve. This permits close control of the valve sealing and performance characteristics. A spout post engaging bead or ridge 635 may be formed on the interior surface of the closure base spout 636 to secure the closure base 630 to the spout post 206 by forming an interference fit with a counterpart ridge or bead 205 (FIGS. 2 and 9) on the spout post 206.

Closure base 630 may include a lid 650 connected thereto via a tethering strap 652. Tethering strap may also function as a lid release assist feature to enable one-hand removal of the lid 650 from a closed position on the retainer 670, as will be described. Closure base 630, lid 650 and tethering strap may be formed integrally as a unitary piece from a suitable thermoplastic, such as polypropylene. Lid 650 may include an annular lid wall 654 extending from a lid end wall 655. A lid sealing ring 656 may extend from the lid wall 654 and provide sealing engagement with the valve and/or retainer, as will be described. Lid 650 may have a number of lid interlock projections 657 extending from an upper, inner surface lid wall 654. Interlock projections 657 may engage one or more grooves or other complimentarily shaped elements on the valve retainer 670 to secure the lid 650 in place thereon. Lid wall 654 may include an annular gripping projection 658 to permit a user to easily remove the lid 650 in a one-hand operation, i.e., by prying it with the user's thumb.

Figure 5:
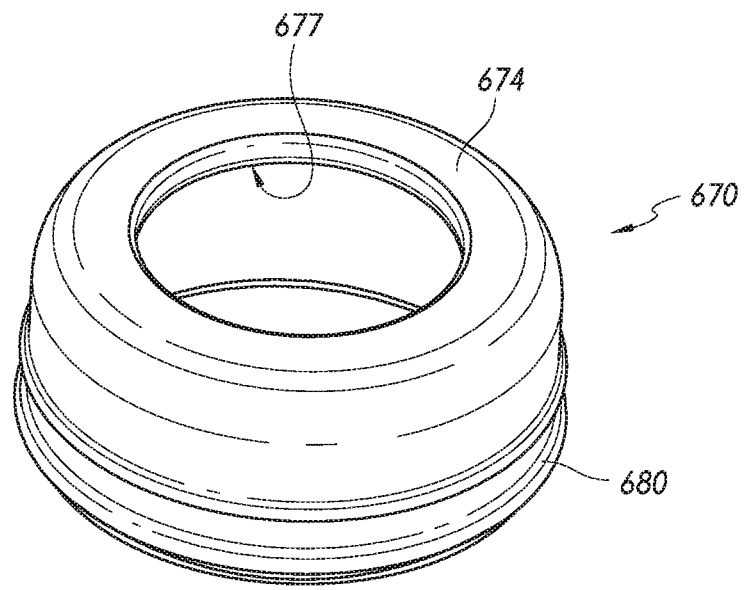
FIG. 5 is perspective of a valve retainer.
Figure 6:
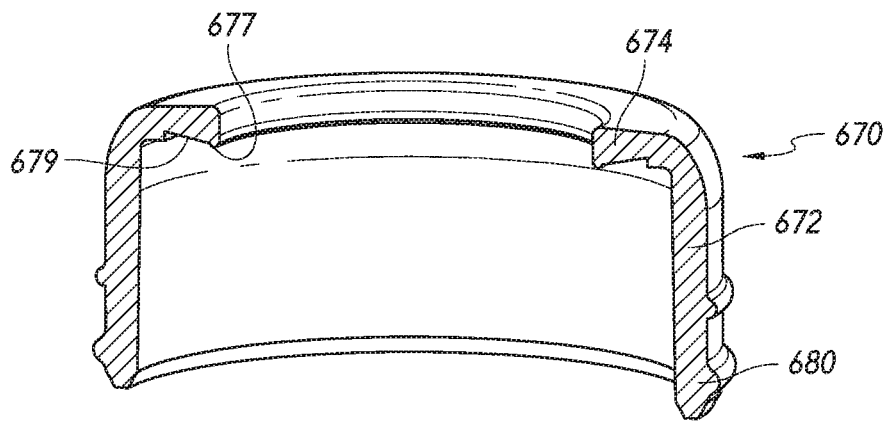
FIG. 6 is a cross-section of the valve retainer of FIG. 4.

FIGS. 5 and 6 illustrate an example valve retainer 670 according to aspects of the disclosure. An annular valve retainer wall 672 extends upward to an inwardly projecting valve retaining ledge 674 with a valve sealing interface 676 defined on the underside thereof for engaging the valve. Valve sealing interface 676 may have an inner lip 677 and a tapered, undercut portion 679 to ensure that the valve surface is sufficiently engaged by the inner lip 677. That is, when the retainer 670 is secured to the cap base 630, the inner lip 677 will apply a concentrated, localized sealing force on the valve along a well-defined perimeter coinciding with the diameter of the annular inner lip 677. As will be recognized, the inner lip 677 in conjunction with the lip or edge 637 on the valve land 639 (FIG. 4) of the closure base spout 635 provides precision control of the amount and location of the clamping force on the valve, which in turn permits close control of the valve sealing and valve performance, i.e., flow characteristics. The outer annular surface of the valve retainer wall 672 may include an annular retaining projection 680 which cooperates with the interlock 640

(FIG. 4) on the closure cap 630. An annular lid retaining projection 682 may also extend around the perimeter of the valve retainer wall 672 and cooperate with the lid interlock projections 657 (FIG. 4) to retain the lid 650 on the valve retainer 670.

Figure 7:
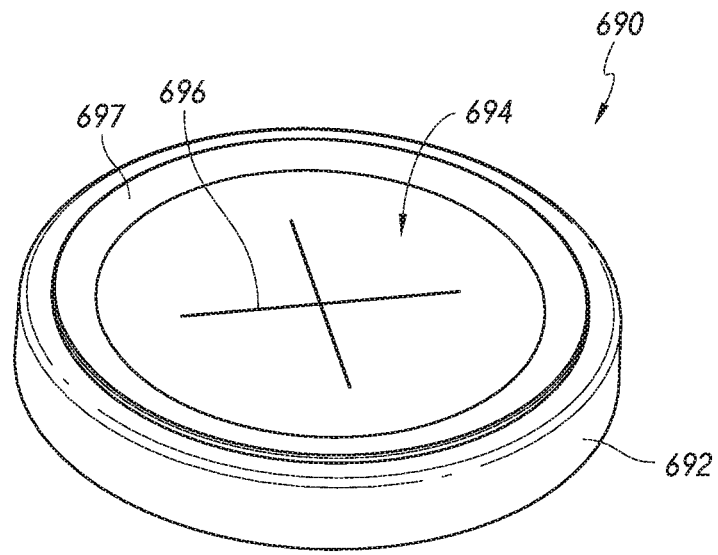
FIG. 7 is a perspective of a dispensing valve.
Figure 8:
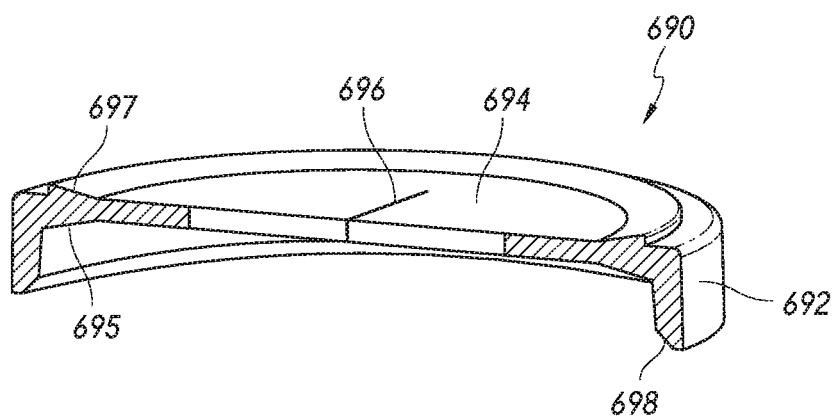
FIG. 8 is a cross-section of the dispensing valve of FIG. 7.

FIGS. 7 and 8 illustrate an example valve 690 according to an aspect of the disclosure. Valve 690 may include an annular valve skirt or wall 692 and a valve membrane 694 extending across the skirt 692. Valve 690 may include one or more valve passages 696 defined therein. In the instant case, the valve passage has a slit configuration with two generally orthogonal slits being formed or being cut in the membrane 694. Other slit configurations are contemplated, including parallel slits or partial concentric or circumferential slits. In addition, other passage forms besides slits are contemplated, including perforations of circular or other shapes. As will be recognized, the thickness of membrane 694, the configuration of the slits or passages 696, the material and associated resiliency of the membrane and other attributes may be selected to provide suitable flow and pressure characteristic for the valve. Applicant has found that favorable flow characteristics may be achieved with the use of Shore 50A food grade silicone for the valve membrane with a thickness of about 0.45 mm and slit configuration of two orthogonal slits, each having a length (diametrical) of about 11 mm. Further, a valve circumferential lip (637 in FIG. 4) and valve retainer inner lip (677 in FIG. 6) diameter of about 12 mm in combination with the above-described valve configuration may provide favorable flow characteristics and control of liquid in the mixing section. Valve skirt 692 may include a tapered lower surface 698 to facilitate quick and/or automated assembly on the cap 630. Opposed tapered surfaces 697 and 695 may extend at an angle of about 23 degrees to one another and may be provided for a complimentary fit with the corresponding surfaces on the cap land 639 (FIG. 4) and the valve retainer 670.

Figure 9:
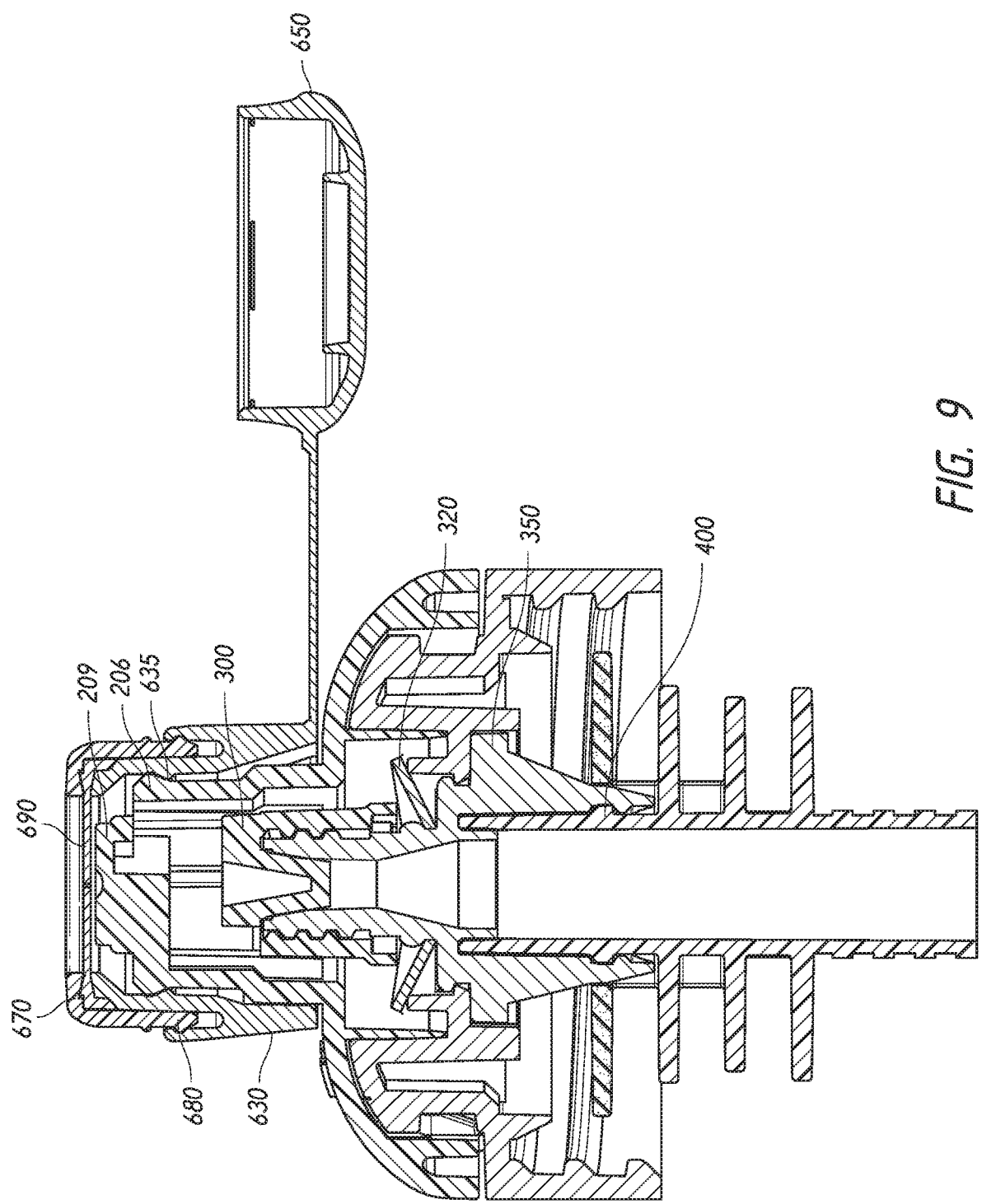
FIG. 9 is a cross-section of an assembled dispensing closure on a mixing cartridge with a closure cap in a removed position.

FIG. 9 is a cross-section showing the dispensing closure 600 and constituent components assembled in an additive delivery system environment. According to aspects of the disclosure, the valve membrane may extend across the top of the spout post, with the slits oriented in a particular way relative to the spout structure. It will be recognized that a residual mixture volume, mixing zone or mixing section may be defined within the assembly between the base liquid flow seal 320 and the mixture dispensing valve 690. Applicant has discovered that favorable flow and mixing characteristics and uniformity of flavor may be achieved by the combination of the described dispensing closure valve and the base liquid valve situated in the described configuration.

As will be recognized, the actuator spout 206 and the specific flow characteristics of the spout, including the radial spokes and intervening radial flow passages therebetween as well as the button shaped projection thereon may provide desirable flow characteristics when combined with the dispensing closure valve 600. More specifically, the radial flow passages may guide respective streams of mixed liquid to particular local areas of the valve membrane and impinge each "sector" defined by the slits in the same way. Moreover, the button-shaped projection prevents flow in the central area of the valve membrane, i.e., where the slits intersect, where the membrane provides less resistance to flow. This interaction may thereby provide a more consistent and predictable stream of liquid dispensed through the closure dispensing valve.

Figure 10:
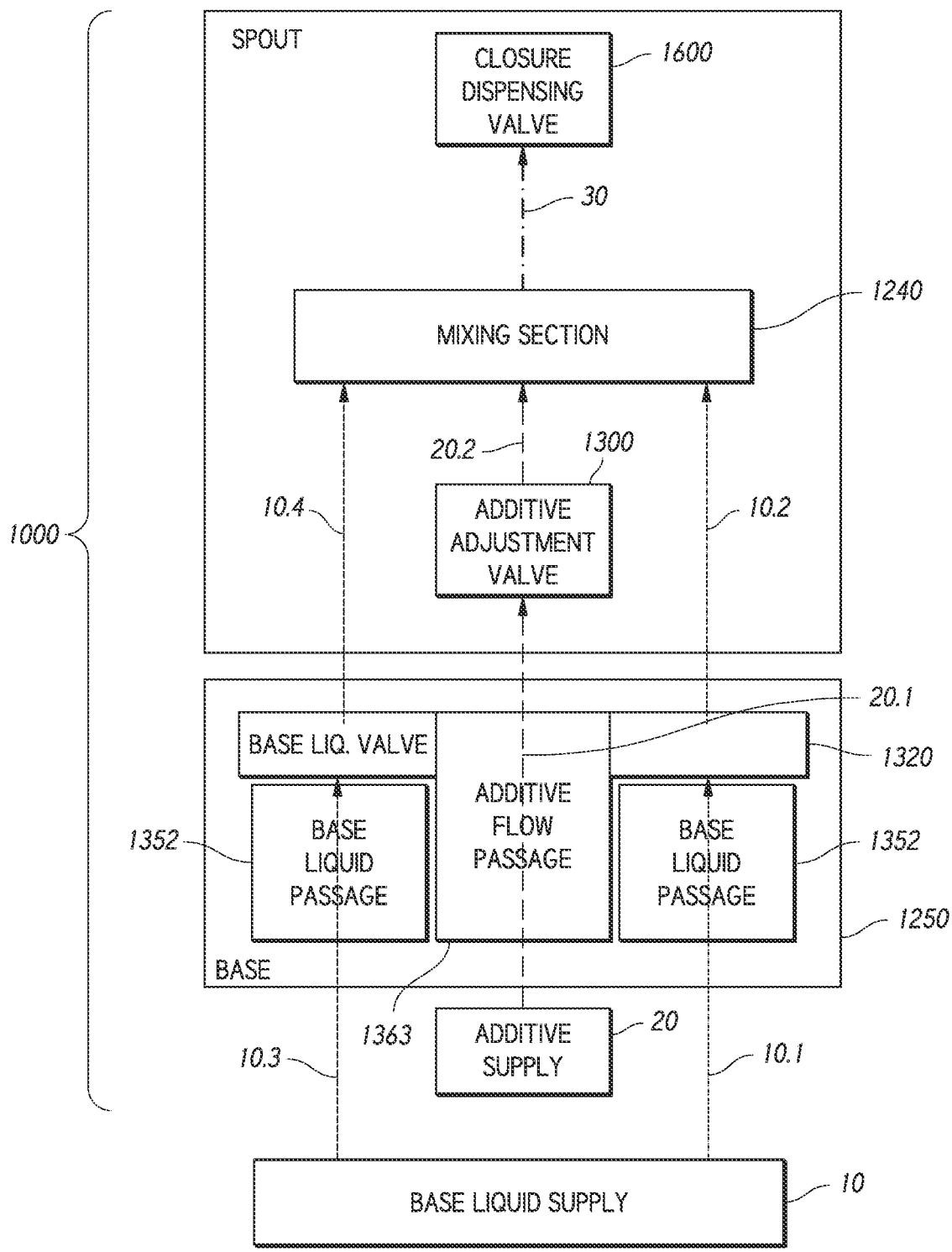
FIG. 10 is a schematic illustration of the components of a cartridge-based additive delivery system including a dispensing valve.

FIG. 10 is a schematic illustration of the additive delivery systems and constituent components contemplated by the instant disclosure. The additive delivery system is generally represented by the reference number 1000. As represented in FIG. 10, multiple base liquid flow paths 10.1 and 10.3 (in this case two are depicted in FIG. 10) may be defined by virtue of multiple flow passages, such as passages 358 (FIG. 1) in the mixing nozzle 350, which may be in a radial pattern around a central additive flow passage 1363. A base liquid flow valve 1320, which provides only one-way flow and prevents backflow of the base liquid, may be associated with each of the base liquid flow paths, as for example, the seal 320 in FIG. 1. Thus, base liquid flow paths 10.1, 10.2, 10.3 and 10.4 are defined from the base liquid supply 10, through base liquid passages 1352 in the base 1250, through the base liquid flow valve 1320 to the mixing section 1240. An additive flow path 20.1 and 20.3 is defined from the additive supply 20 through an additive flow passage 1363 in the base 1250, through additive adjustment valve 1300 to a mixing section 1340. A mixed liquid flow path 30 is defined through the mixing section to the closure dispensing valve 1600. As will be recognized, although additive adjustment valve and additive flow passage elements are illustrated as being disposed in the spout or in the base, their location may be modified and/or interchanged with or to other components in the system within the scope of the disclosure. Similarly, the position and relative orientation of flow paths for the base liquid and the additive may be modified without departing from the scope of the disclosure.

Figure 11:
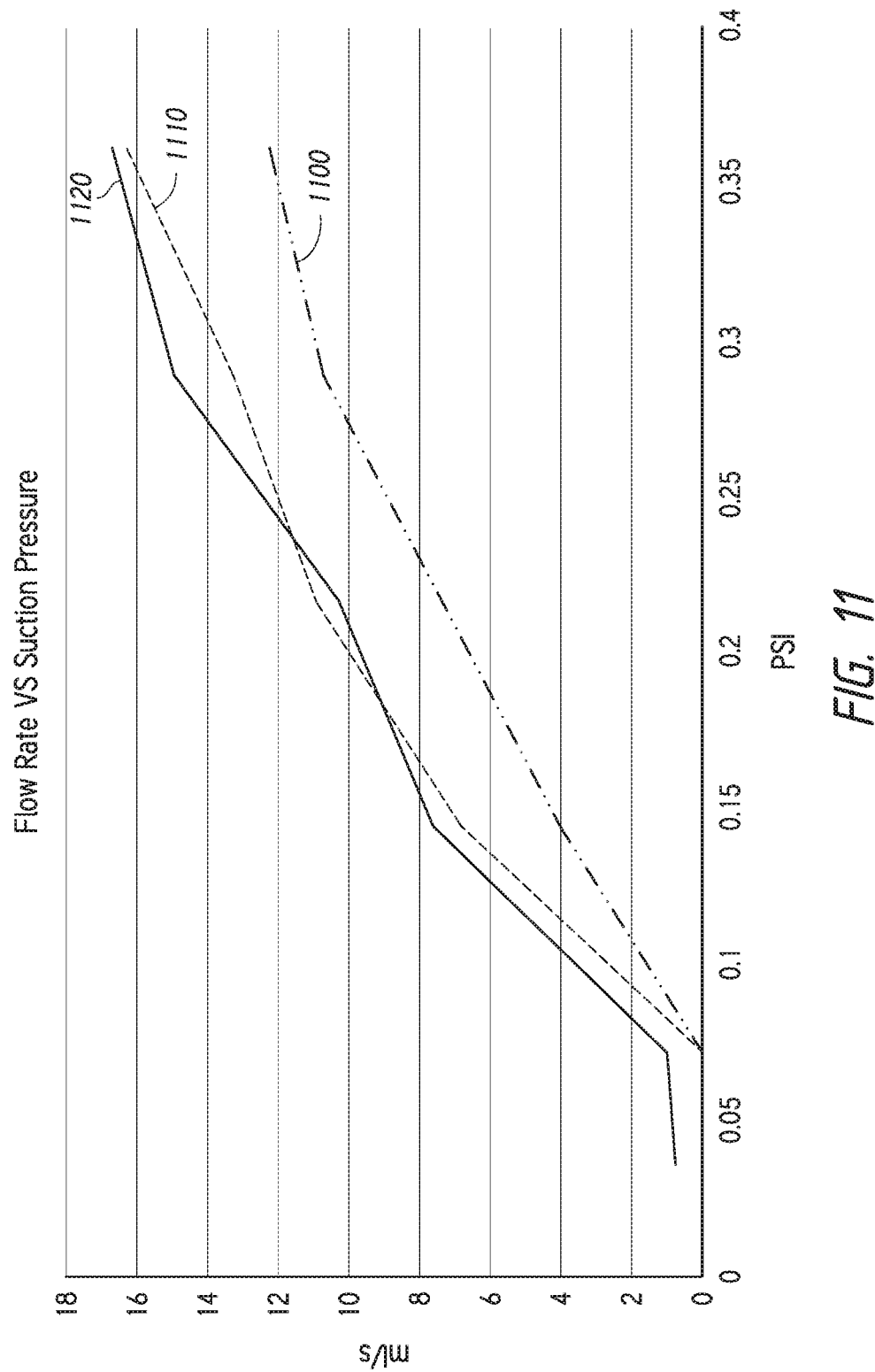
FIG. 11 is a graph illustrating flow rate vs suction pressure for a cartridge based additive delivery system and valve components thereof.

FIG. 11 is a graphical representation of pressure (suction) and flow characteristics for additive delivery systems according to aspects of the disclosure. FIG. 11 also depicts, as the curve 1110 pressure and flow characteristics dispensing closure valves in isolation (i.e., not combined with the environments described herein) for systems in which only a one-way base liquid valve is provided. Curve 1120 represents pressure and flow characteristics of a dispensing closure valve as described herein in isolation (i.e., not combined with the environments described herein). As will be recognized, the interaction of the dispensing closure valve and the base liquid flow valve in the described environments may provide improved mixture flow characteristics. More specifically, curve 1100 shows, from about 0.07 psi to about 0.3 psi, a substantially constant proportional (linear) relationship between the flow rate, from 0.0 to about 10.5 ml/s. In contrast, the flow and pressure characteristics of the isolated dispensing closure valve and isolated base liquid valve exhibit variances in flow rate proportion within the same range. As such, it will be recognized that the interaction of the dispensing closure valve and mixing cartridge environment including the base liquid flow valve as described herein according to aspects of the disclosure provide unexpected results with regard to the achieved flow and pressure characteristics.

Still referring to FIG. 11, it will also be recognized that the flow rate for the dispensing closure valve is preferably selected to be higher than the flow rate for the base liquid valve at most pressures. The dispensing closure valve should be configured to have less impact on flow than the base liquid flow valve. As will also be recognized, the base liquid valve may provide higher threshold pressure for any flow of base liquid to occur and may be configured to prevent flow at the expected pressure on the base liquid valve that may coincide with full inverted base liquid container so as to prevent flow of base liquid when a water bottle is inverted but no suction pressure is applied to the dispensing closure valve. This will isolate the mixing section from the static pressure of the inverted supply of base liquid in the container. This environment enables the dispensing closure valve to be configured to a lower threshold pressure in order to prevent flow from the mixing section of the cartridge when inverted but without suction applied to the dispensing closure valve, i.e., inverted but not sipped by a user.

Figure 12:
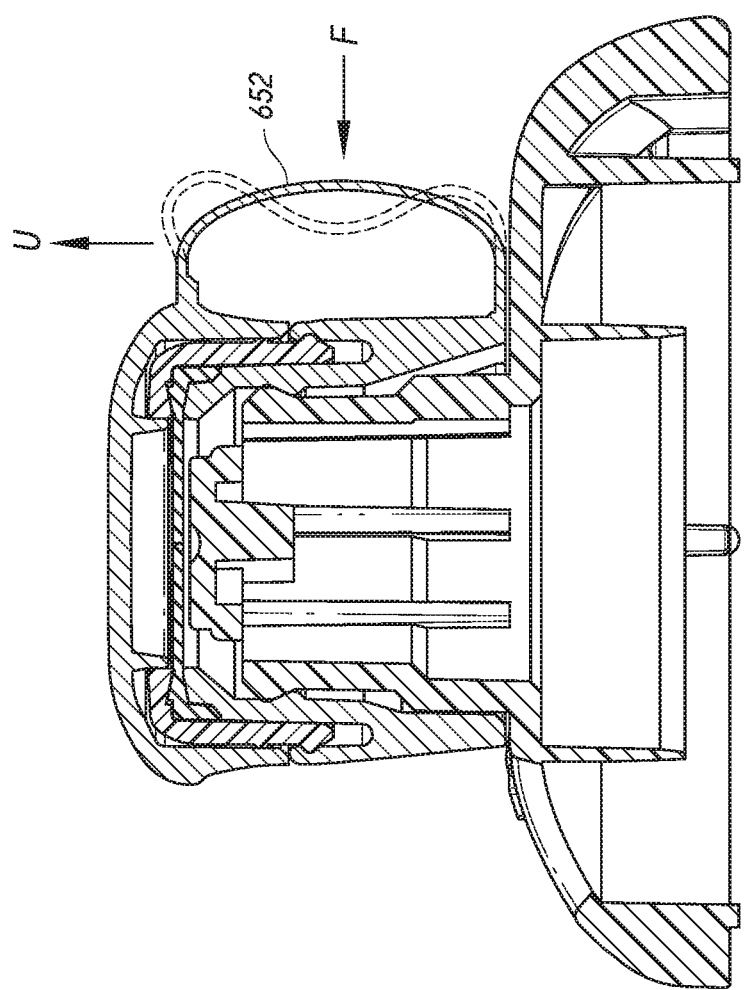
FIG. 12 is a cross-section of an assembled dispensing closure on a mixing cartridge with a closure cap in a closed position.

According to an aspect of the disclosure, the tethering strap may function as an assist feature for removal of the lid in a one hand operation. FIG. 12 is a cross section showing the dispensing closure lid in a closed or installed position on the valve retainer. Application of force, for example, by the user's thumb, in the direction of arrow "F" may result in an upward (lifting) force "U" on the lid at the lid/tethering strap interface. The tethering strap may be attached a lower position on the closure base and may abut an upper surface of the actuator 200 such that the lower part of the tethering strap is constrained against bulging or movement in a downward direction. Application of force "F" thus may result in a deformation of the tethering strap into the shape shown in dotted lines in FIG. 12 and an upward force "U" on the associated side (right side in FIG. 12) of the lid sufficient to overcome the lid interlock on the valve retainer and thus cause the lid to flip open.

Figure 13:
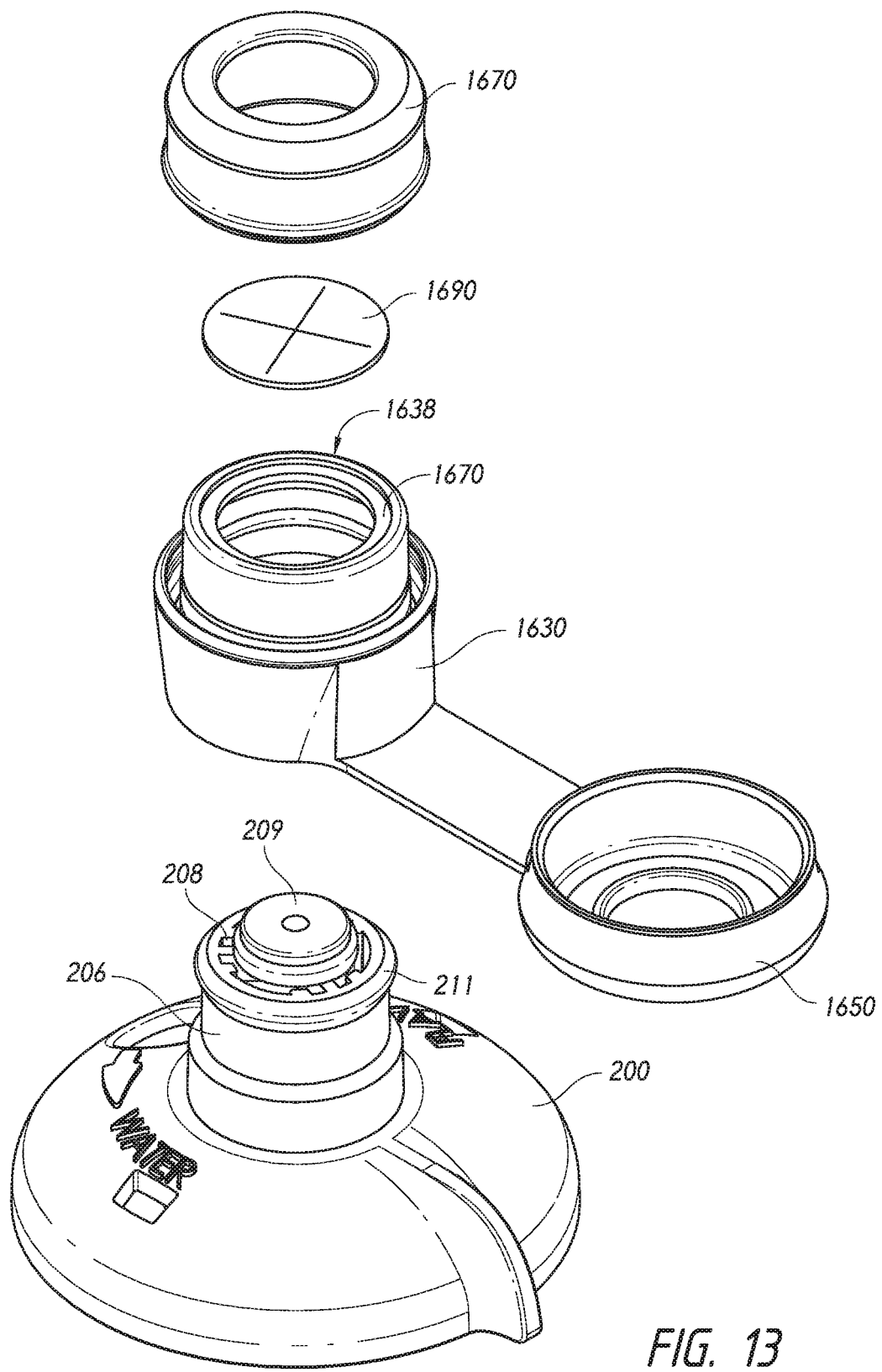
FIG. 13 is an exploded perspective view of an alternative embodiment of a dispensing closure system.
Figure 14:
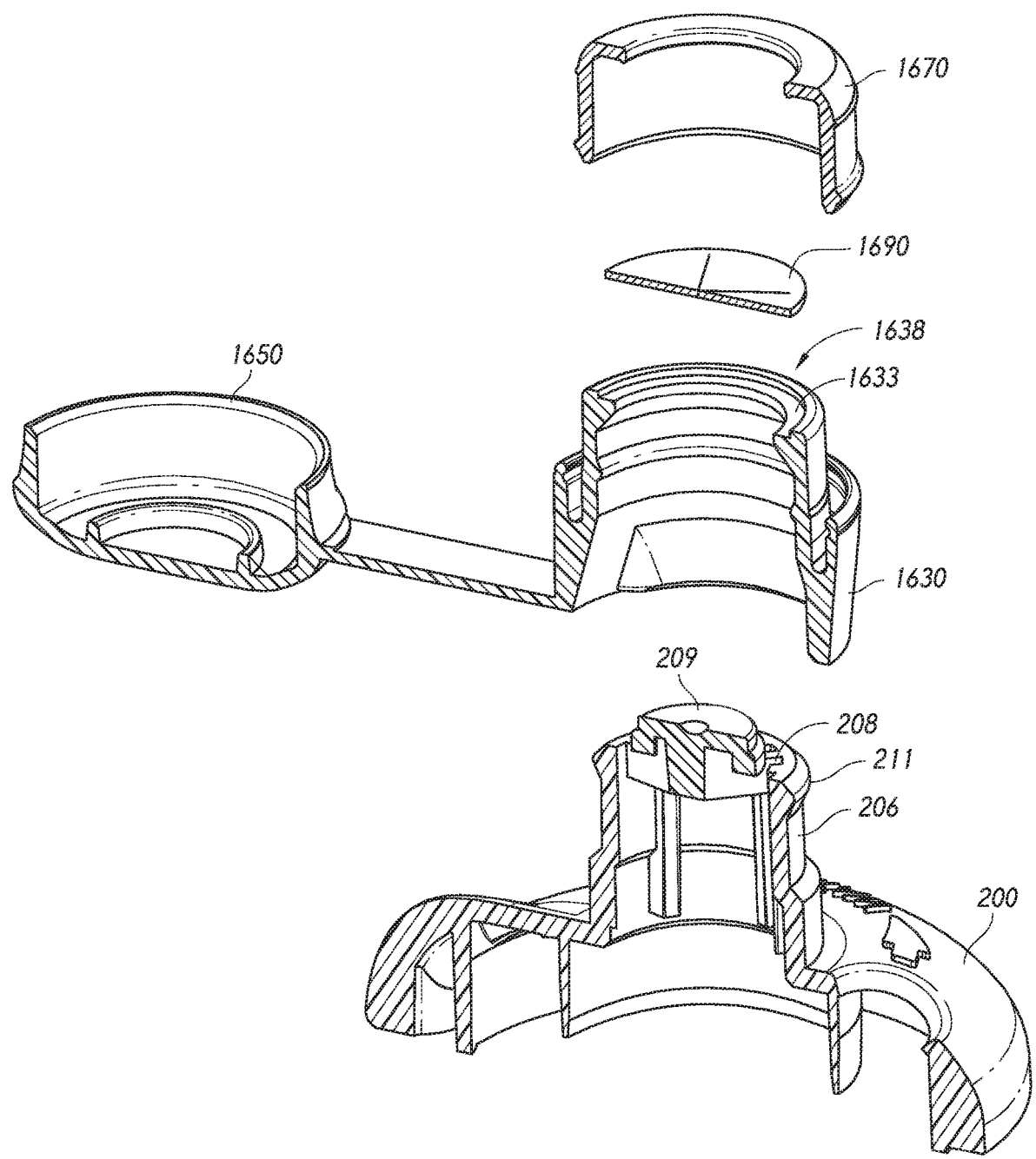
FIG. 14 is an exploded cross-section of the embodiment of FIG. 13.

FIGS. 13-15 illustrate an alternative embodiment for a dispensing closure valve according to aspects of the disclosure. In this embodiment, valve 1690 may be configured without an annular shoulder or skirt and as a flat membrane. Closure base 1630 may include an annular recess 1670 on the valve mounting end 1638 for receiving the slit valve 1690 therein. As shown particularly in FIG. 15, slit valve 1690 may be secured in a position that is in close proximity to or abutting the surface of the projection 209 from the spout 206 to achieve desirable flow characteristics and prevent inadvertent leakage or dripping.

The components described above may be made using injection molding or other known techniques using thermoplastics, such as food grade polypropylene or like materials. The disclosure also contemplates other materials, such as stainless steel or other food grade or non-food grade materials.

It should be understood that implementation of other variations and modifications of the invention in its various aspects may be readily apparent to those of ordinary skill in the art, and that the invention is not limited by the specific embodiments described herein. It is therefore contemplated to cover, by the present invention any and all modifications, variations or equivalents. For example, while the metering function of the additive delivery system has been described using a conical metering component or element, other structures may be used, such as flow control elements that utilize gate or ball valve or other components that provide adjustment of the metering area and flow passage based on user movement of an actuator. In addition, while snap fittings have been described for components, it will be recognized that other fastening structure or techniques may be used, such as threaded or screw fittings, friction fittings, or adhesive or welding techniques.

What is claimed is:

1. An additive delivery system comprising:
a base for mounting the additive delivery system on a container adapted to contain a supply of base liquid;
a mixing nozzle cooperatively associated with the base, the mixing nozzle including a mixing nozzle additive flow passage extending axially through the mixing nozzle, the mixing nozzle further including at least one base liquid flow passage;
a flow metering component cooperating with the mixing nozzle;
an additive adjustment actuator adapted to rotate relative to the base, the additive adjustment actuator adapted to cause the flow metering component to move relative to the mixing nozzle, the additive adjustment actuator including an actuator spout defining a spout flow passage;
the at least one base liquid flow passage and mixing nozzle additive flow passage being arranged to supply base liquid and additive, respectively, to the spout flow passage;
a base liquid flow valve arranged to provide one-way flow through the at least one base liquid flow passage; and
a dispensing closure valve assembly including a flexible dispensing closure valve configured to close to prevent discharge of liquid from the actuator spout in response to a pressure below a threshold pressure required to cause flow through the base liquid flow valve.

2. The additive delivery system of claim 1, wherein the dispensing closure valve assembly comprises a closure base adapted to engage the actuator spout, the dispensing closure valve being secured to the closure base by a valve retainer.

3. The additive delivery system of claim 2, wherein the dispensing closure valve is a slit valve.

4. The additive delivery system of claim 2, wherein the dispensing closure valve includes a flexible valve membrane having a slit, the flexible valve membrane extending to an annular valve skirt and wherein the closure base includes a closure base spout having a shoulder defined thereon for receiving the annular valve skirt.

5. The additive delivery system of claim 1, wherein the actuator spout includes a number of radial spokes supporting a button-shaped projection, the radial spokes defining intervening radial flow passages, wherein the dispensing closure valve assembly includes a dispensing closure valve membrane having at least one slit, the dispensing closure valve membrane being arranged proximate the button-shaped projection.

6. The additive delivery system of claim 5, wherein the dispensing closure valve membrane is disposed adjacent the radial flow passages of the spout.

7. The additive delivery system of claim 1, wherein the dispensing closure valve assembly includes a closure base adapted to engage the actuator spout and a closure lid adapted to sealingly engage the closure base and further comprising a tethering strap secured to the closure lid.

8. The additive delivery system of claim 7, wherein the tethering strap and closure lid are configured such that when the closure lid engages the closure base, a lateral force on the tethering strap by a user causes the closure lid to disengage the closure base.

9. The additive delivery system of claim 8, wherein the tethering strap is attached to a lower end of the closure base and wherein the tethering strap is constrained against downward movement by an actuator on the base.

10. The additive delivery system of claim 1, wherein the at least one base liquid flow passage comprises at least two base liquid flow passages disposed in a radial pattern on the mixing nozzle.

11. The additive delivery system of claim 10, wherein the mixing nozzle additive flow passage is centrally located in the mixing nozzle.

12. The additive delivery system of claim 10, wherein the at least two base liquid flow passages are disposed radially outward from a central axis of the mixing nozzle.

13. The additive delivery system of claim 10, wherein the base liquid flow valve comprises a sealing member arranged to prevent backflow through the at least two base liquid passages.

14. The additive delivery system of claim 1, wherein the dispensing closure valve assembly further comprises:
   a closure base having an annular base wall and a valve retainer interlock defined therein;
   a valve retainer secured to the closure base and retaining the dispensing closure valve on the closure base;
   an annular closure base spout extending from the annular base wall to a valve supporting end; and
   wherein the dispensing closure valve is supported on the valve supporting end, the dispensing closure valve comprising a flexible membrane with at least one slit defined therein, the dispensing closure valve being configured to prevent flow therethrough below the pressure.

15. The additive delivery system of claim 14, further comprising a closure cap secured to the closure base by a tethering strap, the closure cap, closure base and tethering strap being integrally formed as a unitary part, the tethering strap being adapted to exert a removing force on the closure cap when the closure cap is installed on the valve retainer when a force is applied to the tethering strap.

16. The additive delivery system of claim 15, wherein the closure cap further comprises a sealing ring adapted to engage the valve retainer or the dispensing closure valve when the closure cap is installed on the valve retainer.

17. The additive delivery system of claim 14, wherein the dispensing closure valve is configured to facilitate a substantially constant proportional relationship between flow rate from the additive delivery system and pressure when the flow rate varies from 0.0 to about 10.5 ml/s.

18. The additive delivery system of claim 14, wherein the actuator spout includes a spout cap retaining projection, which extends around an outer circumference of the actuator spout and wherein the closure base is adapted to engage and be retained by the spout cap retaining projection.

19. An additive delivery system comprising:
   a base for mounting the additive delivery system on a container adapted to contain a supply of base liquid;
   a mixing nozzle cooperatively associated with the base for facilitating mixing of additive with the base liquid, the mixing nozzle including a central mixing nozzle additive flow passage, the mixing nozzle further including at least two base liquid flow passages arranged in a radial pattern around the central mixing nozzle additive flow passage;
   a flow metering component cooperating with the mixing nozzle;
   an additive adjustment actuator adapted to rotate relative to the base, the additive adjustment actuator including a spout defining a spout flow passage, the at least two base liquid flow passages and mixing nozzle additive flow passage being arranged to supply base liquid and additive, respectively, to the spout flow passage;
   a base liquid flow valve arranged to prevent backflow through the at least two base liquid flow passages;
   the spout having a plurality of spokes supporting a button-shaped projection in a dispensing end of the spout, the plurality of spokes defining intervening spout flow passages; and
   a dispensing closure valve assembly disposed on the spout and having a valve membrane arranged to extend over the button-shaped projection and intervening spout flow passages,
   wherein the valve membrane is configured to close to prevent discharge of liquid from the spout in response to a pressure below a threshold pressure required to cause flow through the base liquid flow valve.

20. The additive delivery system of claim 1, wherein the actuator spout includes radial spokes and radial flow passages defined between the radial spokes, wherein the dispensing closure valve assembly is adapted to hold the flexible dispensing closure valve in close proximity to the radial flow passages.

21. The additive delivery system of claim 1, wherein the actuator spout includes a button-shaped projection and wherein the dispensing closure valve assembly is adapted to hold the flexible dispensing closure valve in close proximity to the button-shaped projection.

22. The additive delivery system of claim 1, wherein the dispensing closure valve assembly includes a closure base with an annular spout engaging skirt for engaging the actuator spout, wherein the annular spout engaging skirt has a tapered inner lower surface to facilitate installation on the actuator spout.

23. The additive delivery system of claim 1, wherein the dispensing closure valve assembly includes a closure base having a valve retainer interlock adapted to receive and retain a valve retainer on the closure base.

24. The additive delivery system of claim 1, wherein the dispensing closure valve assembly includes a closure base having a valve retainer interlock adapted to receive and retain a closure valve retainer on the closure base, the additive delivery system further comprising a closure valve retainer having an annular retaining projection adapted to cooperate with the valve retainer interlock.

25. The additive delivery system of claim 1, wherein the dispensing closure valve assembly is adapted to facilitate a substantially constant proportional relationship between the flow rate from the additive delivery system and suction pressure from about 0.07 psi to about 0.3 psi.

26. The additive delivery system of claim 1, wherein the dispensing closure valve assembly facilitates a substantially constant proportional relationship between a flow rate from the additive delivery system and suction pressure as the flow rate varies from 0.0 to about 10.5 ml/s.

27. The additive delivery system of claim 1, wherein the base liquid flow valve has a base liquid valve threshold pressure for flow of base liquid to occur, and wherein the dispensing closure valve has a dispensing closure valve threshold pressure for flow of mixed base liquid and additive to occur, wherein the base liquid threshold pressure is higher than the dispensing closure valve threshold pressure.

28. The additive delivery system of claim 1, wherein the base liquid flow valve is configured to prevent flow of base liquid at a pressure coinciding with pressure on the base liquid flow valve resulting from a full inverted base liquid container.

29. The additive delivery system of claim 1, wherein the dispensing closure valve is configured to prevent flow from the spout flow passage when the additive delivery system is inverted.

30. The additive delivery system of claim 1, wherein the flexible dispensing closure valve further comprises two substantially orthogonal slits.

31. The additive delivery system of claim 1, wherein the flexible dispensing closure valve further comprises a valve skirt adapted to facilitate assembly on the dispensing closure valve assembly.

32. The additive delivery system of claim 1, wherein the dispensing closure valve assembly is adapted to engage a spout cap retaining projection of the actuator spout to retain the dispensing closure valve assembly on the actuator spout.

* * * * *